Patented Oct. 5, 1943

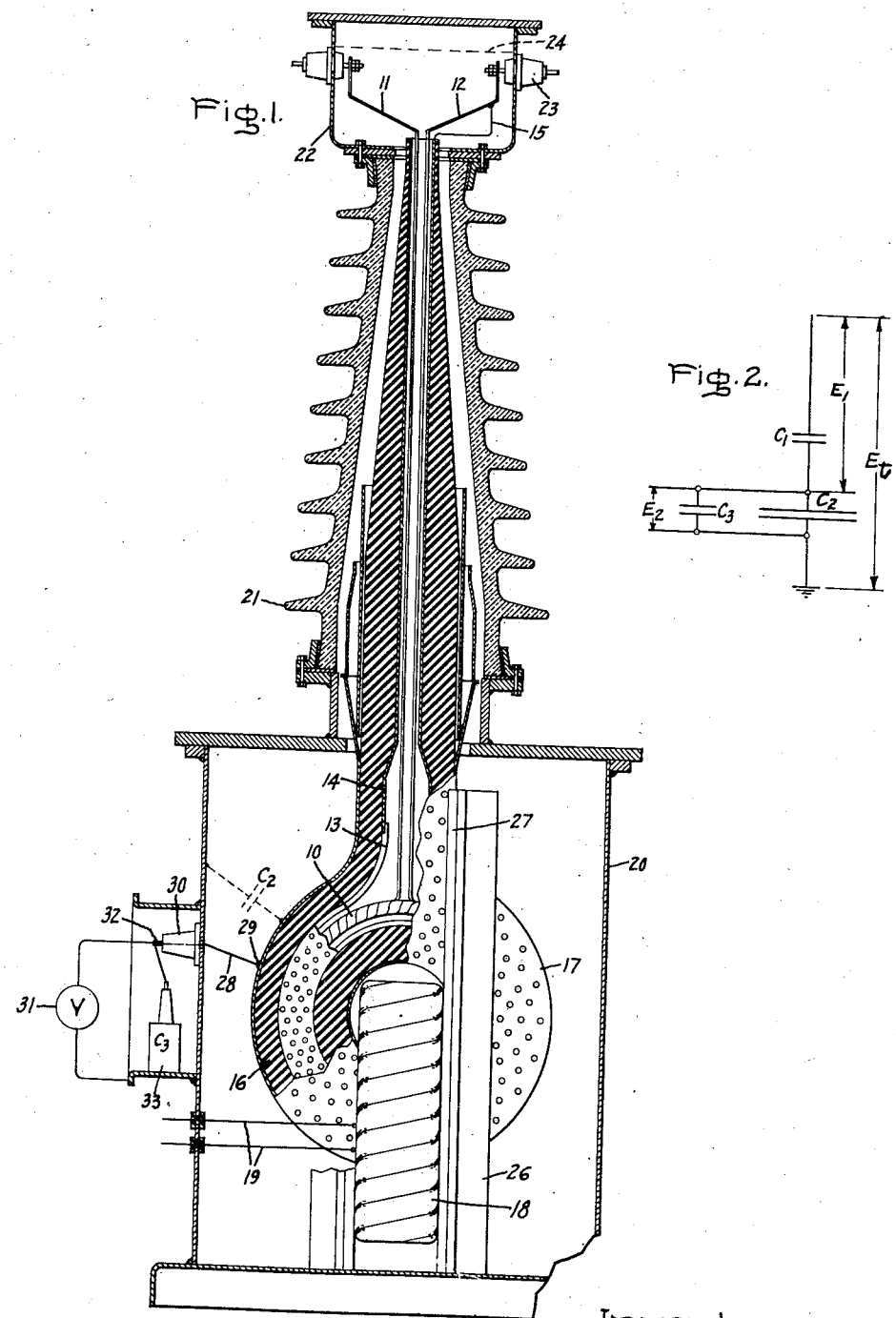
Inventor:
Guglielmo Camilli,
by Harry E. Dunham
His Attorney.

2,331,106

UNITED STATES PATENT OFFICE 2,331,106

ELECTRIC INDUCTION APPARATUS

Guglielmo Camilli, Pittsfield, Mass., assignor to General Electric Company, a corporation of New York Application June 9, 1942, Serial No. 446,329

4 Claims. (Cl. 171—95)

My invention relates to electric induction apparatus, and to a potential measuring arrangement for current transformers.

An object of my invention is to provide an improved potential measuring arrangement which may be applied to an electric induction apparatus.

Another object of my invention is to provide an improved potential measuring arrangement which may be applied to a current transformer.

A further object of my invention is to provide an instrument transformer with an improved combination for measuring the current flowing through the line and the potential of the line.

Further objects and advantages of my invention will become apparent from the following description referring to the accompanying drawing, and the features of novelty which characterize my invention will be pointed out with particularity in the claims annexed to and forming a part of this specification.

In the drawing Fig. 1 is a sectional side elevation of a current transformer which is provided with an embodiment of my invention, and Fig. 2 is a diagrammatic representation of the capacities and voltages of the device illustrated in Fig. 1 and which will be used in explaining my invention.

In the illustrated embodiment of my invention I have combined my improved potential measuring device with a current transformer, but it is to be understood that my invention may be employed with any other suitable type of electric apparatus. The arrangement illustrated in the drawing includes a current transformer having a high voltage winding adapted to be connected into a line and a low voltage winding with which the current flowing through the high voltage winding may be determined. A shield surrounds the high voltage winding and has predetermined inherent capacities with respect to the high voltage winding and with respect to ground. The voltage may be measured during operation of the apparatus between the conductive arrangement and ground, and the voltage of the high voltage winding and line above ground may therefore be determined by multiplying the measured voltage by the ratio of the capacities between the conductive shield and ground and the conductive shield and the high voltage winding.

Referring more particularly to Fig. 1 of the drawing, a transformer is illustrated having a primary or high voltage winding 10 which is adapted to be connected to any suitable line through leads 11 and 12. A conductive shield 13 surrounds and is spaced from the high voltage winding 10, the shield 13 terminating in a conductive tube 14 which surrounds the leads 11 and 12. The shields 13 and 14 may be electrically connected to the high voltage winding 10 through a conductor 15. Suitable insulation, such as crepe paper 16, surrounds the shield 13 and tube 14 and a second conductive member or shield 17 surrounds the insulation 16. A low voltage winding 18 passes through and around the toroidal shaped high voltage winding 10, and the winding 18 is provided with terminal leads 19 for measuring the current passing through the low voltage winding 18. Knowing the transformation ratio of the windings, the current flowing through the high voltage winding may then be determined from the current flowing through the low voltage winding. A tank 20 surrounds the high and low voltage windings and supports a suitable insulator 21 which surrounds the leads 11 and 12. On top of the insulator 21 is provided an expansion chamber 22 which supports high voltage terminals 23 through which a suitable line may be connected to the leads 11 and 12. A suitable insulating fluid may be introduced into the tank 20 which may fill the bushing 21 and expansion chamber to any suitable level 24. It will be noted that both shields 13 and 17 are perforated so that the insulating fluid may permeate through the porous insulation 16. Such a structure as described above is described and claimed in my Patent 2,280,625, issued April 21, 1942, and assigned to the same assignee as this present invention.

In order to measure the potential between the high voltage winding 10 and some other potential such as ground, the shield 17 may be suitably insulated from ground and the voltage measured during operation of the apparatus between the shield 17 and ground. The shield 17 may be insulated from the tank 20 in any suitable manner, such as by spacing it a sufficient distance, as is indicated in Fig. 1, and supporting brackets 26 which support the windings may be insulated from the shield 17 through insulating spacers 27.

Referring to Fig. 2 of the drawing it will be seen that the capacity between the shield 17 and the shield 13 or the high voltage winding will be some suitable value indicated by the numeral $C_1$, and the capacity between the shield 17 and ground will be a value $C_2$ depending upon the constants of the system. Therefore, upon measuring the voltage $E_2$ between the shield 17 and ground, the voltage $E_t$ between the high voltage winding and ground may be determined by the equation:

$$E_t = E_2 \times \frac{C_2}{C_1} + E_2 \qquad (1)$$

In order to measure the voltage between the shield 17 and ground I provide an electrical conductor 28 which is connected at one end as shown by the numeral 29 to the shield 17 and is insulated from the ground casing 20 by a bushing 30. A suitable instrument indicated by the numeral 31 may then be connected between the terminal 32 of the bushing 30 and ground and the voltage between the shield 17 and ground may be measured by the instrument 31. The voltage $E_t$, which is the voltage between the high voltage winding and ground may, therefore, be determined by the equation as given above.

In order to make the ratio of the capacities $C_1$ and $C_2$ an even number or to correct for possible variations in the manufacturing process, a suitable capacitor 33, such as a variable capacitor $C_3$, may be connected between the terminal 32 and ground. Thus the voltage $E_t$ when employing the capacitor $C_3$ may be determined by the equation:

$$E_t = E_2 \times \frac{C_2 + C_3}{C_1} + E_2 \qquad (2)$$

In view of the foregoing it will be seen that I have provided a simple arrangement for measuring the voltage between a winding and another potential such as ground of a suitable electric induction apparatus such as a current transformer.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States, is:

1. An electric induction apparatus including a high voltage winding, spaced apart conductive shields surrounding said winding, solid porous insulation within the space between said shields, the inner of said shields being adjacent to and electrically connected to said high voltage winding, conductive housing means spaced from and around the outer of said shields and adapted to be connected to ground potential, a conductor connected to said outer shield and insulated from said surrounding means adapted to be connected to ground, and means including said conductor for measuring the voltage between said outer shield and ground during operation of said apparatus.

2. An electric induction apparatus including a winding, a shield surrounding and being connected to said winding, a second shield surrounding said first shield and having a predetermined capacity with respect to said first shield, a low voltage winding outside said second shield and being inductively related with said high voltage winding for measuring the current flowing through said high voltage winding during operation of said apparatus, means for insulating said second shield from ground, said second shield having a predetermined capacity to ground, and means for measuring the voltage between said second shield and ground.

3. An electric induction apparatus including a winding, a shield surrounding and being connected to said winding, a second shield surrounding said first shield and having a predetermined capacity with respect to said first shield, a low voltage winding outside said second shield and being inductively related with said high voltage winding for determining the current flowing through said high voltage winding during operation of said apparatus, said second shield having a predetermined inherent capacity with respect to said first shield and to ground, means for connecting a capacitor between said second shield and ground so as to make a substantially even ratio of the capacities between said shields and said second shield and ground, and means for measuring the voltage between said second shield and ground.

4. An instrument transformer including a high voltage winding adapted to be connected to a line, a low voltage winding inductively related with said high voltage winding for determining the current flowing through said line, conductive means having a predetermined capacity, $C_1$, to said high voltage winding and a predetermined capacity $C_2$ to ground, and means for measuring the voltage $E_2$ between said conductive means and ground whereby the voltage between said high voltage winding and ground may be determined by the expression:

$$E_2 \times \frac{C_2}{C_1} + E_2$$

GUGLIELMO CAMILLI.